Oct. 26, 1954

J. M. FETHEROLF 2,692,985

RADAR INDICATOR APPARATUS

Filed June 12, 1946

INVENTOR
JAMES M. FETHEROLF
BY
ATTORNEY

Oct. 26, 1954

J. M. FETHEROLF 2,692,985

RADAR INDICATOR APPARATUS

Filed June 12, 1946

INVENTOR
JAMES M. FETHEROLF
BY
Paul B. Hunter
ATTORNEY

Oct. 26, 1954
J. M. FETHEROLF
2,692,985
RADAR INDICATOR APPARATUS
Filed June 12, 1946
3 Sheets-Sheet 3
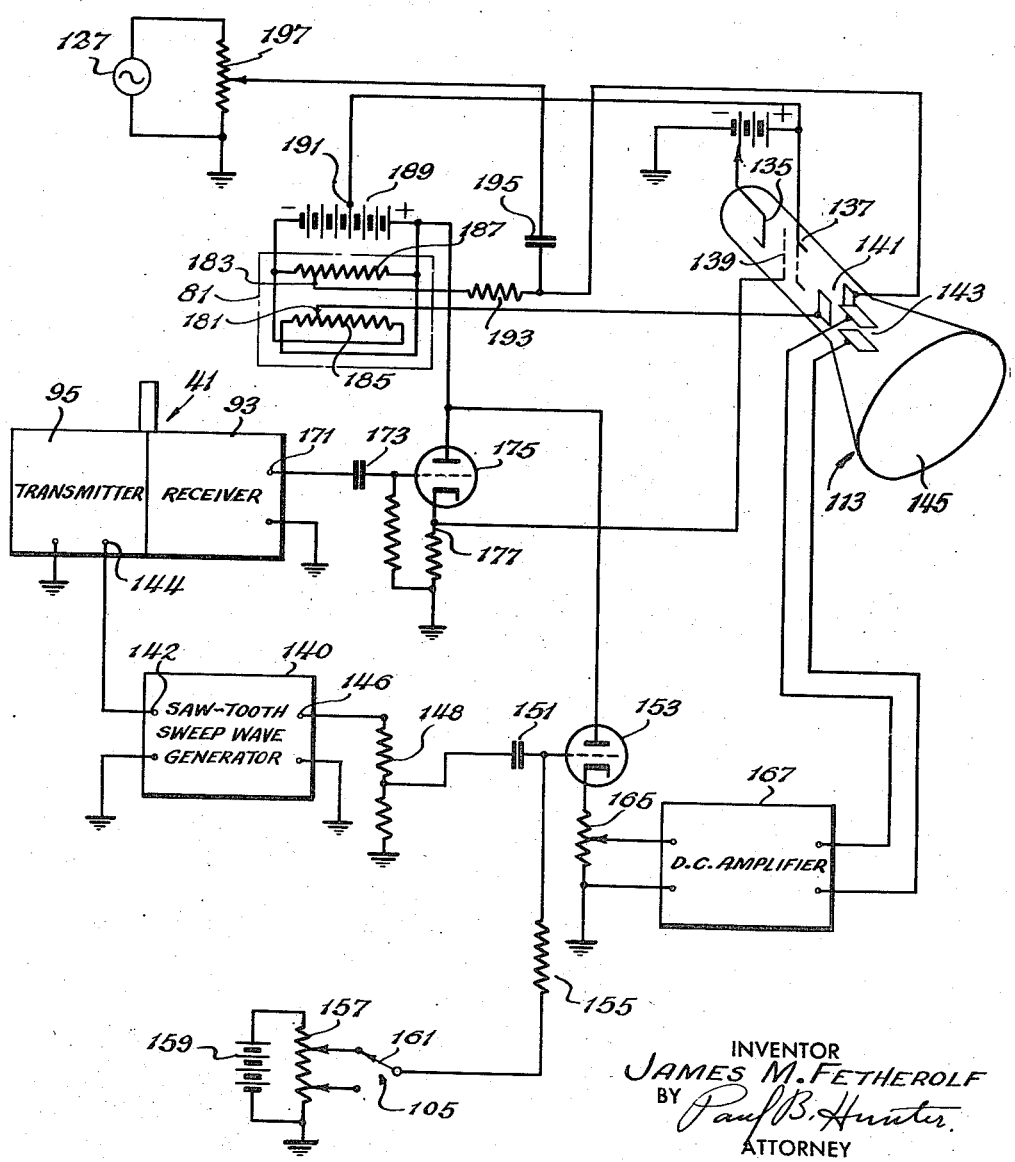

Patented Oct. 26, 1954

2,692,985

UNITED STATES PATENT OFFICE 2,692,985

RADAR INDICATOR APPARATUS

James M. Fetherolf, White Plains, N. Y., assignor to The Sperry Corporation, a corporation of Delaware Application June 12, 1946, Serial No. 676,188

2 Claims. (Cl. 343—11)

The present invention relates to data presentation apparatus for directional radio systems such as radar systems, and particularly to apparatus suitable for the indication of positions of energy reflecting objects in a wide field of search of a radar system.

The position of a remote object, which may be obscured to visual observation by rain or fog, may be ascertained by employment of a radar system or radio object direction and range finding apparatus. A radar system in one well-known form employs an ultra-high-frequency radio pulse transmitter and an ultra-high-frequency receiver, the pulse transmitter being employed for the recurrent production of high power ultra high frequency energy pulses, and the receiver being employed to receive the relatively weak energy pulses which are reflected back from a distant object upon which the transmitted energy impinges. Ordinarily, a directive antenna is incorporated in the radar system for confining the transmitted energy directions or the received energy directions, or both, to a very small angular zone, such as a zone of angular extent of the order of 3°. This antenna may be periodically moved or scanned throughout a wire directive range, and the direction of a remote object may be determined according to the direction of the antenna at the moment of maximum signal strength of energy reflected from the object. The distance of the object is determined according to the time delay between transmission of a radio energy pulse and reception of the corresponding reflected energy pulse.

The location of remote objects, in terms of distance and direction, may be portrayed upon an indicating apparatus coupled to the radar transmitter and receiver units. Such indicating apparatus usually incorporates an oscilloscope or related apparatus. The oscilloscope may include cathode ray beam generation and intensity control elements and beam deflection elements. Heretofore, such indicators have been employed for azimuthal search indicators, the oscilloscope beam being deflected horizontally through an appreciable extent synchronously with the horizontal or azimuthal scanning of the radar directive antenna, and being recurrently deflected vertically at substantially uniform speed in synchronism with the production of the recurrent radio pulses by the transmitter. With such an arrangement, the height of the deflectible beam at an instant of reflected pulse reception represents the distance of the object from which the energy pulse was reflected. The beam intensity is controlled according to the output signals produced by the radar receiver, so that a distinctive mark is produced upon the indicator screen at a height representing the distance of the energy reflecting object and at an azimuthal position on the screen representing the azimuth direction of the object.

Such indicator arrangements have been made to perform satisfactorily where the directive antenna of the radar system merely scans through a wide range of azimuthal directions at a fixed angle of elevation. Recently, however, it has been found desirable to cover a range of angles of elevation greater than the vertical angular extent of the directive pattern of the antenna. This has been accomplished by providing a supplemental type of motion to the directive antenna, e. g., a conical scanning motion throughout a small angular range, in combination with the wide-range azimuthal scanning, and by shifting the average angle of elevation of the directive pattern from a first angle of elevation for azimuthal scans in one direction to an appreciably different average angle of elevation for azimuthal scans in the opposite direction. The combination of the conical scanning motion and the wide range azimuthal movement results in the sweep of the directive radar energy pattern throughout a projected pattern corresponding to the sum of a low-speed straight component of motion and a high-speed circular component of motion, the resultant projection pattern resembling a well-known practice form taught in the Palmer system of penmanship. Accordingly, this mode of operation of the radar search antenna has been named "Palmer Scan." As a result of the shifts in the angle of elevation, furthermore, the resultant projection pattern is made to resemble two Palmer penmanship practice traces, one above the other.

Although the type of indicator above described is usable to some extent in connection with a radar system employing the Palmer Scan mode of search, the single graph ordinarily portrayed on the oscilloscope screen, indicating object distance versus azimuthal direction, proves inadequate in connection with the enlarged elevation angle coverage provided by the scanning system described above. Such conventional indication failed to provide any distinction as to those targets detected at a high angle of elevation and those detected at a lower angle of elevation.

It is an object of the present invention to provide improved data presentation apparatus and particularly, to provide data presentation apparatus ideally suited for use with radar search systems wherein the directive pattern of the antenna is swept through an azimuthal range at a first angle of elevation and subsequently, at a different angle of elevation.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In accordance with a principal feature of the invention, the oscilloscope data presentation pattern is divided into a plurality of sections, each of which represents an azimuth sweep at an associated angle of elevation. Two such portions of the oscilloscope pattern may be employed, for example, where the directive antenna system is swept to the right in azimuth at a first angle of elevation, and to the left in azimuth at a second angle of elevation, the sweeps at the first and second angles of elevation being alternately performed and being synchronized with the control of the corresponding portions of the oscilloscope pattern. For convenience, and to facilitate natural association of each pattern portion with the related antenna pattern average elevation angle, the pattern portions, each a distance vs. azimuth angle graph, may be "stacked" one above another on the oscilloscope screen, a higher graphic portion of the pattern representing objects detected at a higher angle of elevation. In this way, an object at a relatively high angle of elevation is represented only in the upper portion of the pattern, and an object at a relatively low angle of elevation is represented only in the lower portion of the pattern. An object at an intermediate angle of elevation may reflect appreciable energy to the receiver during each of the sweeps, and hence is represented by duplicate images in the upper and lower portions of the oscilloscope pattern.

The above objects and general description will now be amplified by a more detailed description of an embodiment of the present invention, as illustrated in the drawings, wherein:

Fig. 7 is a circuit diagram of a radar object position indicating system embodying the present invention.

Like reference characters are used throughout the drawings to indicate corresponding parts thereof.

Figure 1:
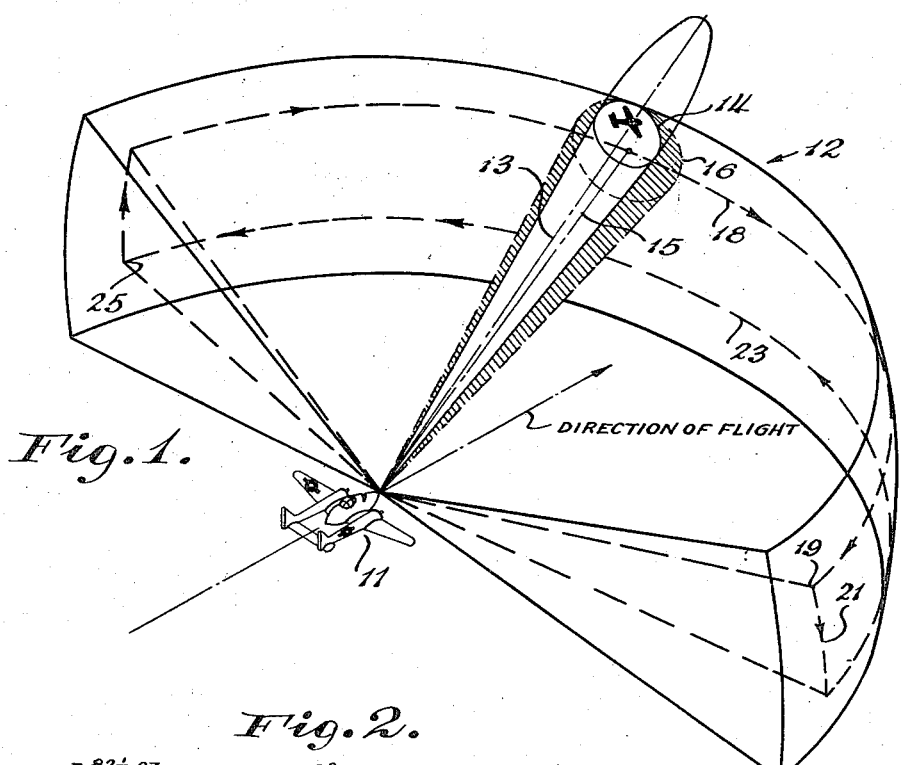
Figs. 1, 2 and 3 illustrate a version of "Palmer Scan" with alternate sweeps in azimuth in opposite directions at appreciably different angles of elevation.

In Fig. 1, there is indicated a craft 11 within which is incorporated a radar system for the detection and position indication of objects located within a wide azimuthal range of directions. Fig. 1 shows a spherical projection 12 of the directional range searched by the radar system. This range may be of the order of 180° or even greater in azimuthal extent, and it may be made to extend through a range of angles of elevation appreciably greater than the angular extent of the radar directive antenna pattern, by the employment of conical scanning at high speed concurrently with the lower-speed scanning through the wide azimuthal range. For even more extended coverage in angle of elevation, the antenna system is scanned to the right at a first average angle of elevation and to the left at a second average angle of elevation. In Fig. 1, the axis of the antenna directive beam is indicated at 13 and the angular extent of the beam is indicated by the projection circle 14. This directive pattern, having the axis 13 and the extend indicated at 14, may be regularly moved at a very high speed according to a conical plan of movement, wherein the directive antenna pattern is swept throughout a conical zone about an axis 15, affording coverage of a projected area indicated by the projection circle 16.

Along with this movement throughout a narrow-range conical zone of the directive pattern of the antenna, there may be exerted on the antenna a general movement to the right in azimuth as indicated along the projection arc 18, so that a broad angular range in azimuth will be searched. Furthermore, at the end 19 of the movement of the antenna system to the right, the antenna direction may be depressed substantially vertically, as along projection line 21, to a lower angle of elevation as denoted by the arc 23, and the directive antenna pattern may then be swept to the left along this projection arc until a left hand limit 25 is reached, the antenna elevation angle then being increased and the scan cycle being repeated.

Figure 2:
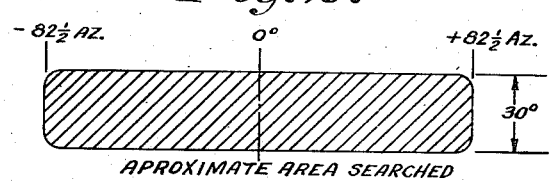

The overall extent of the directions searched by the antenna system during movement throughout this range is indicated in Fig. 2, this figure being substantially a developed cylindrical projection of a typical Palmer search range of directions, and including angular dimensions corresponding to such a directional range.

Figure 3:
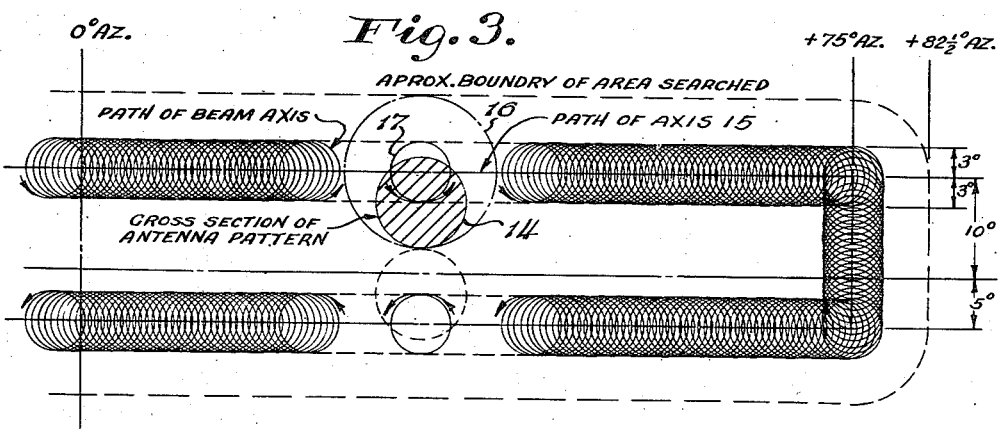

Fig. 3 is a further developed cylindrical projection showing the resultant path of the directive antenna pattern axis 13, and indicating the relative extents of the directive pattern projection 14, the conical search projection 16, and the projected orbit 17 of movement of the directive pattern axis 13 throughout the conical search cycles. The azimuthal extent of the projection set forth in Fig. 3 corresponds to the right-hand half of the total search projection area illustrated in Figs. 1 and 2.

Figure 4:
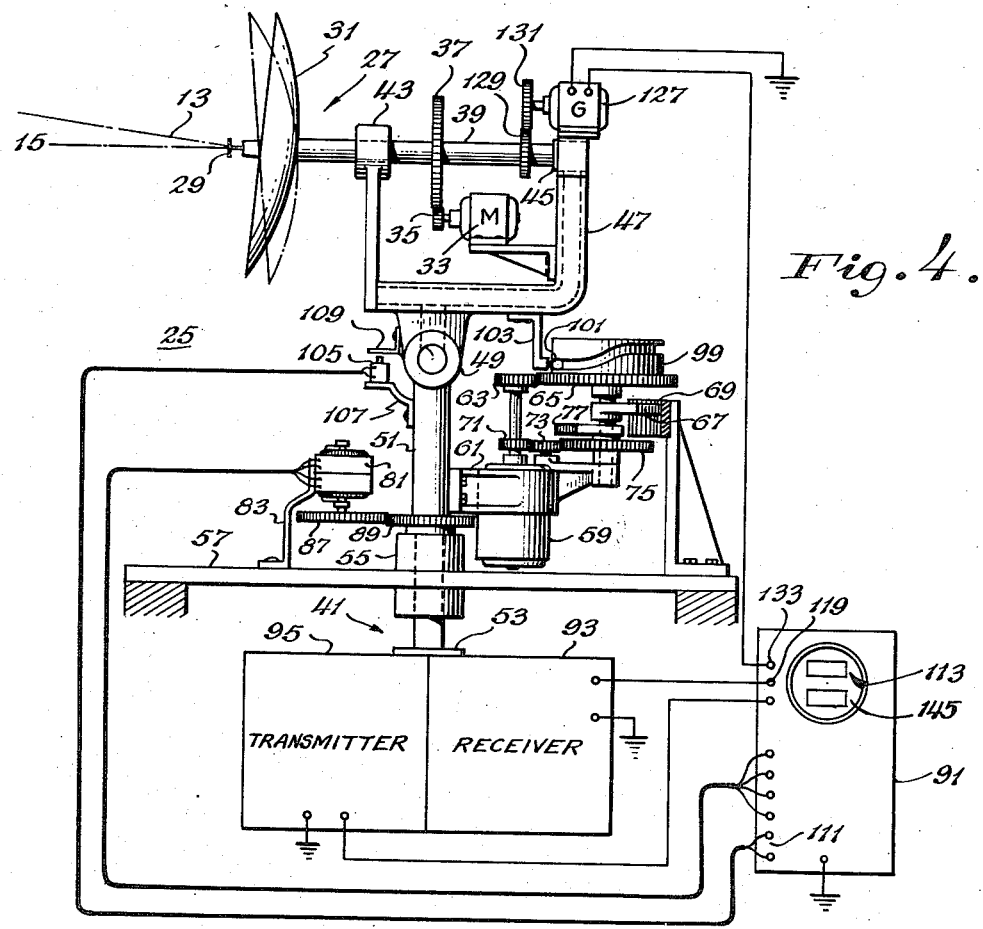
Fig. 4 is a side elevation of a schematic arrangement or radar apparatus adapted for the Palmer search scan indicated in Figs. 1–3.

Fig. 4 illustrates a schematic radar system 25 wherein a directive antenna 27 is conically scanned about an axis 15, the relation of the antenna exciter element 29 and a paraboloidal reflector 31 associated therewith being such that the directive pattern of the antenna is aimed along a slightly divergent axis 13. This relation may be produced by a slight inclination of the reflector 31 from alignment of its axis with the rotation axis 15, or by location of the exciter element 29 at a point very slightly displaced from the focal point of the reflector 31.

A high-speed motor 33 may be coupled through gears 35 and 37 to a longitudinally extending conduit section 39 which may be arranged both for conducting energy between the directive antenna 27 and associated radio apparatus 41 and for supporting the antenna 27 for rotation about the axis 15 in bearings 43 and 45. The conduit section 39 may be joined in a rotation-permitting junction at bearing 45 to a further conduit section 47, which may be coupled in turn through a still further rotation-permitting junction 49, a vertical column conduit section 51, and a final rotation-permitting junction 53 to the radar apparatus 41. All of the conduit members 39, 47 and 51 may be hollow conductive sleeves serving as wave guides, or any desired ones of the conduit members may include inner conductors, and thus may be employed as coaxial transmission lines.

The main vertical column 51 may be arranged for rotation in a vertical-axis bearing 55 provided in a fixed platform 57. An azimuth and elevation drive motor 59 affixed to the column 51 as by a bracket 61 may be coupled through spur gears 63 and 65 to a sector gear 67, arranged to engage an internal sector gear 69 affixed to platform 57. Motor 59 may also be coupled through a further chain of spur gears 71, 73 and 75 to a further sector gear 77 rotated in the opposite direction but at equal speed with the rotation of sector gear 67, and also arranged for engagement with the fixed sector gear 69. The sector gears 67 and 77 alternately engage the fixed sector gear 69, in such a way that the entire rotatable assembly supported in bearing 55 is rotated first to the right and then to the left with the alternate engagements of the rotating sector gears 67 and 77. The angle of elevation of the antenna is shifted from a first predetermined elevation angle to another at the end of each azimuthal sweep, as by a cam 99 fixed to gear 65 and a cam follower 101 fixed as by a bracket 103 to the assembly pivoted in bearing 49. A dual potentiometer unit 81 supported from the platform 57 as on a bracket 83 may be coupled to the vertical column 51 through gears 87 and 89 and employed for supplying to an indicator unit 91 a principal horizontal deflection signal voltage varying exactly according to the azimuthal position of column 51, i. e., according to its rotation relative to platform 57.

The radio apparatus 41 includes a receiver 93 coupled to the indicator unit 91 and a transmitter 95 also coupled to the indicator unit, for enabling the indicator unit 91 to show the distance of an energy-reflecting object determined in accordance with the time delay between generation of a radar transmission pulse by transmitter 95 and the detection of the reflected energy pulse by the radar receiver 93.

The indicator unit 91 includes a saw-tooth wave generator connected to oscilloscope 113 for vertical beam deflection. This generator is adjusted to operate at a frequency corresponding to the repetition rate of pulse generation by transmitter 95, and is snychronized with the transmitter 95 in such a way that each vertical sweep of the oscilloscope beam is initiated synchronously with the transmission of a corresponding radar energy impulse. The output terminal of the receiver 93 is connected to a beam intensity control terminal 119 of the indicator 91, for varying the oscilloscope beam intensity at the instants of reception of energy reflected from a remote object.

As a result of the conical scan component produced by the rapid rotation of the antenna 27 by motor 33, relatively strong energy impulses are received from a remote object not only when the vertical column 51 has been rotated just to the position for alignment of the axis 15 toward a target, but also during an appreciable length of time before and after arrival of the column 51 at this point, because the coverage of the antenna pattern is effectively broadened by conical scanning of the antenna.

According to an invention of J. M. Lester, disclosed and claimed in copending patent application Serial No. 675,402, filed June 8, 1946, on which Patent No. 2,570,251 issued on October 9, 1951, and which is assigned to the assignee of the present invention, the horizontal sweeping of the oscilloscope beam in the indicator 91 is effected not merely as a function of the variation of output voltage from the azimuth dual potentiometer unit 81, but as a combination of this voltage with an alternating voltage of higher frequency and lower amplitude produced by an alternating voltage generator 127 coupled through gears 129 and 131 to the antenna 27, and arranged to provide an output voltage varying as an acccurate representation of the horizontal or azimuthal component of change of direction of the directive pattern axis 13 according to the rotation of antenna 27 by motor 33.

Figure 5:
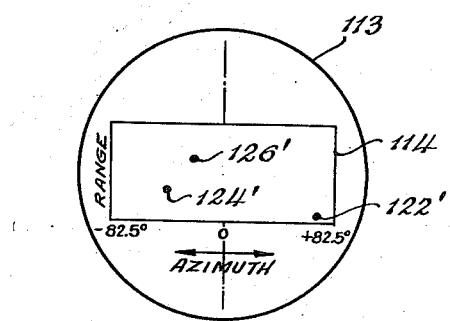
Fig. 5 is an illustration of a type of radar oscilloscope pattern, wherein a single picture area or graph represents the distances of all detected objects plotted against the azimuthal angle directions of the objects.

With apparatus as thus far described, there would be produced upon the screen of the oscilloscope 113 an indication pattern corresponding to a single graph 114 as shown in Fig. 5, representing the range or distance of each detected object plotted vs. the azimuth angle thereof. Such a pattern, while useful to some extent, would fail to provide any indication of the elevation angle at which a target is detected. Accordingly, the target information presented in a pattern such as that shown in Fig. 5 is ambiguous as to angle of elevation of the targets, and hence may result in confusion of an operator at a time when a target represented by a dot on the screen is shown to have come to such close range as to warrant a conversion from wide-range search scan over to a conical tracking scan such as may be employed for directing a gun or guns toward the target.

Figure 6:
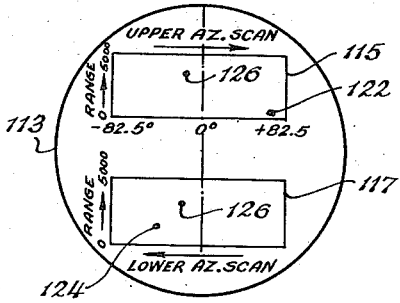
Fig. 6 illustrates an improved indicator presentation wherein the data pattern is divided into a plurality of object distance versus azimuth angle graphs corresponding to radar detection of objects at different angles of elevation.

In accordance with an important feature of the present invention, the information pattern presented upon the screen of the oscilloscope is divided into a plurality of generally similar portions, each representing a corresponding average range of elevation angle. If the radar system searches alternately along an upper elevation angle and a lower elevation angle, for example, the pattern is divided into two similar graphic portions—an upper plot 115, and a lower plot 117, as shown in Fig. 6.

The division of the oscilloscope pattern into two separate graphic portions 115 and 117 may be accomplished by producing an appropriate shift of bias voltage applied to the vertical deflection circuit of the cathode ray oscilloscope 113 concurrently with each shift of angle of elevation of antenna 27. For this purpose, a switch 105 may be connected to the indicator 91 and may be supported from the column 51 as by a bracket 107, to be actuated according to the movement of the antenna assembly supported and pivoted at bearing 49, as by a bracket 109 affixed to this assembly and arranged to cooperate with the switch 105.

The circuit details of an embodiment of the present invention are set forth in Fig. 7. The oscilloscope 113 may be of the cathode ray type, provided with a cathode 135, an electron beam accelerating electrode 137, a beam intensity control electrode 139, a horizontal deflection element or elements such as a pair of horizontal deflection plates 141, and vertical deflection elements such as a pair of vertical deflection plates 143. A substantially circular fluorescent screen 145 may be provided therein for impingement of the electron beam, to provide an illuminated mark where the beam impinges thereon during application of an intensifying voltage to control electrode 139.

The high potential output terminal 171 of the receiver 93 is coupled through a capacitor 173 to the control electrode circuit of a cathode follower amplifier stage 175, and the output terminal 177 of the cathode follower stage 175 is connected to the control electrode 139 of the oscilloscope 113, for changing the intensity of the oscilloscope beam in response to changes of output voltage of the radar receiver 93.

The horizontal sweep circuit of the cathode ray oscilloscope 113 includes connections between the horizontal deflection plates 141 and the movable arms 181 and 183 of the dual potentiometer 81. These arms move together on stator resistor elements 185 and 187, respectively, connected between the negative and positive terminals of a battery 189 having a mid-tap 191 connected to the accelerating electrode 137. A coupling circuit including a series resistor 193 and a coupling capacitor 195 is connected to the horizontal sweep circuit and the capacitor 195 is connected to a potentiometer 197 connected between the output terminals of the generator 127 which, as shown in Fig. 4, is operated synchronously with the rotation of generator 127. Through the coupling circuit 197, 195, 193, the generator 127 adds to the positional output voltage from the dual potentiometer 81, a higher-frequency alternating voltage component corresponding in phase and relative magnitude with that component of motion of the directive axis 13 of antenna 27 about the axis of the column 51, resulting from the rotation of the antenna 27 by motor 33. Accordingly, the voltage between the deflection plates 141 varies with time in such a way that the beam through the oscilloscope 113 moves horizontally in exact accordance with the azimuthal resultant movement of the antenna 27 due to the combined effects of the low-speed oscillatory rotation of the column 51, and the high-speed movement of the antenna by the motor 33.

The saw-tooth sweep wave generator is indicated at 140. This generator includes an input frequency control terminal 142 connected to a synchronizing pulse terminal 144 of the transmitter 95. The high potential output terminal 146 of the saw-tooth wave generator 140 is coupled through a voltage divider resistance circuit 148 and a coupling capacitor 151 to the control electrode of a cathode follower amplifier stage 153. The output voltage of cathode follower 153, developed across cathode output resistor 165, is applied to the input terminals of a direct coupled amplifier 167, and the output terminals of the amplifier 167 are connected to the vertical deflection plates 143 of the oscilloscope 113.

The control electrode of the cathode follower stage 153 is connected to a grid resistor 155 connected in turn to the switch 105 which is operated in accordance with change of elevation angle of the antenna 27 (Fig. 4). The switch 105 may be employed for selective connection to different points on a voltage divider resistor 157 connected across a voltage source 159. When the movable arm 161 of the switch 105 is thrown from one position to the other, in response to the change of tilt of the antenna system 27, it changes the voltage applied to the control electrode of the cathode follower amplifier stage 153 from a first predetermined voltage to a second, for shifting the range of vertical sweep of the oscilloscope 113 from a first range to a second range. The second range is removed from the first so that the separate plots such as the plots 115 and 117 in Fig. 6 are alternately scanned by the cathode ray oscilloscope beam in synchronism with the alternate scans of the directive antenna 27 to the right along arc 18 and to the left along arc 23, respectively (Fig. 1).

With this important feature incorporated in a radar system, an object providing strong reflected signals in the receiver 93 only during the scan of the directive pattern at the upper elevation angle, i. e., along the arc 18 shown in Fig. 1 is represented by an image appearing only in the upper scan portion 115 (Fig. 6), e. g., by an image dot 122. Likewise, an object reflecting appreciable radar pulse energy to the receiver 93 only during the lower elevation scan, i. e., the scan along arc 23, is represented by an image appearing only in the lower azimuth scan portion 117 of the pattern, e. g., by an image dot 124. An object at an intermediate angle of elevation, and hence substantially equally effective upon the radar receiver 93 during the upper and lower elevation scans, is represented by duplicate images 126 in both the upper scan portion 115 and the lower scan portion 117 of the object position pattern provided on the oscilloscope 113. Likewise, an object moving downward at an appreciable distance from the radar system 25 will be represented first in the upper portion 115, then in both portions, and finally in the lower portion 117 of the pattern, only.

The elimination of ambiguity as to detected object elevation angle is more fully appreciated by comparison of the improved indicator presentation of Fig. 6 with the portrayal in Fig. 5 of a data presentation which would result under corresponding conditions with a single graph oscilloscope pattern. In Fig. 5, the three detected objects discussed above in relation to Fig. 6 are represented by image dots 122′, 124′ and 126′, without any demarcation relative to the difference of elevation angles of the three images. Thus, it is clearly seen that the pattern of Fig. 6 provided by the present invention not only supplies all of the information presented by the prior art pattern of Fig. 5, but also the additional data as to the angle of elevation of the line toward each of the radar objects represented.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radar system comprising: an oscilloscope arranged for production and intensity control of a spot-illuminating beam and for vertical and horizontal deflection of said beam; periodical saw-tooth sweep means for sweeping the beam vertically upward through a predetermined extent from a horizontal base line, and means for periodically vertically shifting the range of upward vertical sweeping of said beam by a predetermined amount exceeding said predetermined extent; a radar pulse transmitting and receiving unit, for generation of energy pulses for transmission to a remote object and detection of energy pulses received from the object, said received pulses being delayed after the transmitted pulses by a time interval corresponding to the distance of said object; means including a directive antenna coupled to said unit for affording directional selectivity; means for rotating the directive axis of said directive antenna at a relatively high speed about a spin axis that intersects said directive axis at a small angle, to rapidly scan a relatively small conical sector of space, means for sweeping the direction of said spin axis first to the right and then to the left throughout a relatively large sector at a relatively low speed, means for sweeping said oscilloscope beam horizontally in accordance with the resultant motion of said directive axis in azimuth, means for shifting said directive antenna apparatus stepwise from a first angle of elevation to a second angle of elevation synchronously with the vertical shifting of said oscilloscope beam, said first and second angles of elevation differing from each other by an angle that is more than double said small angle, means for synchronizing the transmission of radio pulses with the initiation of each vertical sweeping of said oscilloscope beam, and means for varying the intensity of said oscilloscope beam according to variations of intensity of the signals detected by said unit.

2. A radar system including an antenna having a directive axis, means for rotating said directive axis about a spin axis intersecting said directive axis at an angle to scan a conical volume of space, means for sweeping said spin axis alternately to the left and to the right in azimuth throughout an angular sector that is large compared to the apex angle of said conical volume, and means for changing the elevation angle of said spin axis from one value to another that differs therefrom by more than said apex angle, substantially in coincidence with each reversal of the direction of sweeping of said spin axis in azimuth; radio transmitter-receiver means coupled to said antenna for transmitting repetitive pulses and for receiving said pulses after reflection from a reflecting object, a cathode ray oscilloscope with beam intensity control means connected to said receiver, and horizontal and vertical beam deflection means; means coupled to said antenna and connected to said horizontal deflection means for varying the horizontal position of the cathode ray beam in accordance with the position of said directive axis in azimuth, means coupled to said transmitter-receiver means and connected to said vertical deflection means for sweeping said beam vertically from a horizontal baseline upon transmission of each pulse, and means coupled to said antenna and to said vertical deflection means for changing the vertical position of said baseline in accordance with each change in the position of said spin axis in elevation.

References Cited in the file of this patent

UNITED STATES PATENTS

| Number | Name | Date |
|---|---|---|
| 2,189,549 | Hershberger | Feb. 6, 1940 |
| 2,405,238 | Seeley | Aug. 6, 1946 |
| 2,415,981 | Wolff | Feb. 18, 1947 |
| 2,423,518 | Rhea | July 8, 1947 |
| 2,425,330 | Kenyon | Aug. 12, 1947 |
| 2,444,031 | Busignies | June 29, 1948 |
| 2,446,024 | Porter | July 27, 1948 |
| 2,471,264 | Doherty | May 24, 1949 |
| 2,606,318 | Haworth | Aug. 5, 1952 |
| 2,610,320 | Hall | Sept. 9, 1952 |